US010513994B2

(12) United States Patent
Sammer (10) Patent No.: US 10,513,994 B2
(45) Date of Patent: Dec. 24, 2019

(54) METHOD AND SYSTEM FOR REGENERATING A SOOT PARTICLE FILTER

(71) Applicant: Bayerische Motoren Werke Aktiengesellschaft, Munich (DE)

(72) Inventor: Christoph Sammer, Traun (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 62 days.

(21) Appl. No.: 15/957,413

(22) Filed: Apr. 19, 2018

(65) Prior Publication Data

US 2018/0238251 A1 Aug. 23, 2018

Related U.S. Application Data

(63) Continuation of application No. PCT/EP2016/073049, filed on Sep. 28, 2016.

(30) Foreign Application Priority Data

Oct. 21, 2015 (DE) .................. 10 2015 220 486

(51) Int. Cl.
*F01N 9/00* (2006.01)
*F02D 41/02* (2006.01)
(Continued)

(52) U.S. Cl.
CPC ....... *F02D 41/029* (2013.01); *B01D 46/0063* (2013.01); *B01D 46/446* (2013.01);
(Continued)

(58) Field of Classification Search
CPC ...... F01N 3/0237; F01N 9/002; F01N 11/002; F01N 2550/04; F01N 2560/08;
(Continued)

(56) References Cited

U.S. PATENT DOCUMENTS

| 2003/0230079 A1* | 12/2003 | Kuboshima ............. F01N 3/023 60/295 |
| 2004/0200271 A1* | 10/2004 | van Nieuwstadt .......................... B01D 46/0036 73/114.78 |
| 2013/0000282 A1* | 1/2013 | Takayanagi ........ B01D 46/0086 60/295 |

FOREIGN PATENT DOCUMENTS

| DE | 10 2007 034 709 A1 | 2/2008 | |
| EP | 2423480 A2 * | 2/2012 | ............. F01N 9/002 |

(Continued)

OTHER PUBLICATIONS

PCT/EP2016/073049, International Search Report dated Dec. 14, 2016 (Two (2) pages).

(Continued)

*Primary Examiner* — Jonathan R Matthias
(74) *Attorney, Agent, or Firm* — Crowell & Moring LLP (57) ABSTRACT

A method and system for regenerating a soot particle filter of an internal combustion engine is disclosed. The engine control unit determines a pressure difference from a differential pressure signal received from a differential pressure sensor, which pressure difference is present between an exhaust gas inlet and an exhaust gas outlet of the soot particle filter. The method compares the pressure difference to a pressure difference threshold value and operates the combustion engine in a regeneration operating profile if the determined pressure difference is smaller than the pressure difference threshold value. If the determined pressure difference is greater, a differential pressure correction device is connected between the differential pressure sensor and the engine control unit and a differential pressure simulation signal is generated by the differential pressure correction device and transmitted to the engine control unit to operate (Continued)

the internal combustion engine in the regeneration operating profile.

20 Claims, 2 Drawing Sheets (51) Int. Cl.
    B01D 46/00      (2006.01)
    B01D 46/44      (2006.01)
    F01N 11/00      (2006.01)
    F02D 41/26      (2006.01)
(52) U.S. Cl.
    CPC ............ *F01N 9/002* (2013.01); *F01N 11/002* (2013.01); *F02D 41/26* (2013.01); *B01D 2279/30* (2013.01); *F01N 2550/04* (2013.01); *F01N 2560/08* (2013.01); *F01N 2900/10* (2013.01); *F01N 2900/1406* (2013.01); *F01N 2900/1606* (2013.01); *F02D 2200/0812* (2013.01); *Y02T 10/47* (2013.01)

(58) Field of Classification Search
    CPC ..... F01N 2900/1406; F01N 2900/1606; B01D 46/446
    See application file for complete search history.

(56) References Cited

FOREIGN PATENT DOCUMENTS

| EP | 2 581 572 A1 | 4/2013 |
| EP | 2 644 858 A1 | 10/2013 |
| JP | 3918619 B2 * | 5/2007 |
| JP | 2015068237 A * | 4/2015 |

OTHER PUBLICATIONS

German Search Report issued in German counterpart application No. 10 2015 220 486.3 dated Jun. 8, 2016, with Statement of Relevancy (Six (6) pages).

* cited by examiner

METHOD AND SYSTEM FOR REGENERATING A SOOT PARTICLE FILTER

CROSS REFERENCE TO RELATED APPLICATIONS

This application is a continuation of PCT International Application No. PCT/EP2016/073049, filed Sep. 28, 2016, which claims priority under 35 U.S.C. § 119 from German Patent Application No. 10 2015 220 486.3, filed Oct. 21, 2015, the entire disclosures of which are herein expressly incorporated by reference.

BACKGROUND AND SUMMARY OF THE INVENTION

The invention relates to a method and system for regenerating a soot particle filter.

Soot particle filters or diesel particle filters (DPF) for internal combustion engines of motor vehicles are known from the general prior art. As an indicator for a particle quantity situated in the DPF, use is normally made of a differential pressure corresponding to the pressure loss across the DPF, wherein, when a predetermined differential pressure is reached, a regeneration process of the DPF is started. For the regeneration, it is common for the DPF to be supplied with exhaust gas from the internal combustion engine with a high exhaust-gas temperature, and for an oxidation of the particles situated in the DPF to thus be initiated. However, if no regeneration is initiated in the presence of the predetermined differential pressure, for example because the required exhaust-gas temperatures cannot be realized, such as is the case in internal combustion engines of motor vehicles over short journeys, the quantity of particles situated in the DPF increases further. This can lead to a regeneration no longer being possible during driving operation, because the thermal energy content of the particles is then so great that an uncontrolled oxidation of the particles could lead to thermal destruction of the soot particle filter. The regeneration of the DPF is then normally blocked by a control system, and the DPF must be exchanged. This is generally associated with high costs, and shortens the service life of the DPF.

DE 10 2007 034 709 A1 discloses an exhaust-gas purification device with a diesel particle filter (DPF). The exhaust-gas purification device has a regeneration device for performing a regeneration of the DPF. The regeneration device performs a first regeneration until a predetermined time point which is configured in accordance with a value of a decision parameter, for example the differential pressure across the DPF. During the first regeneration, the temperature in the DPF is detected, and the maximum temperature reached is determined. On the basis of the maximum temperature reached, the decision parameter is corrected such that a second regeneration of the filter occurs at a later or earlier time point, that is to say in the presence of a greater or lesser differential pressure. In the case of this exhaust-gas purification device, a flexible criterion is specified for the regeneration time point. However, even with this, overloading of the filter cannot reliably be prevented under all circumstances.

It is an object of the invention to provide a method and a system for regenerating a soot particle filter, with which each case the service life of the soot particle filter is improved and the latter can be regenerated in an economically advantageous manner.

According to the invention, a method is provided for regenerating a soot particle filter of an internal combustion engine, in particular of an internal combustion engine of a motor vehicle, wherein, from a differential pressure signal received from a differential pressure sensor, an engine control unit determines a pressure difference which prevails between an exhaust-gas inlet and an exhaust-gas outlet of the soot particle filter with a differential pressure sensor detected pressure difference and is proportional to a particle quantity situated in the soot particle filter, and the engine control unit compares the pressure difference with a pressure difference threshold value in order to operate the internal combustion engine in a regeneration operating profile if the determined pressure difference is smaller than the pressure difference threshold value, wherein, if the determined pressure difference is greater than the pressure difference threshold value, manual electrical connection of a differential pressure correction device between the differential pressure sensor and the engine control unit is performed, and, by means of the differential pressure correction device, generation of a differential pressure simulation signal is performed, in the case of which the engine control unit determines a pressure difference which is smaller than the pressure difference threshold value, in order to operate the internal combustion engine in the regeneration operating profile.

By means of the connection of the differential pressure correction device, it is possible for a regeneration of the soot particle filter to be performed without modifying the regulation processes of the engine control unit. The connection may be performed for example during maintenance work on the engine or on the soot particle filter.

By means of the generation of the differential pressure simulation signal using the differential pressure correction device, a regeneration of the particle filter, which is no longer permitted per se by the engine control unit on the basis of the comparison of the determined pressure difference with the pressure difference threshold value, is made possible again or re-enabled. In this way, the service life of the soot particle filter is lengthened, because in this way, a greater number of regeneration cycles can be performed.

The differential pressure simulation signal may be generated in particular by multiplication of the differential pressure signal by a correction factor.

Here, the correction factor may advantageously be defined in a manner dependent on the detected pressure difference. In particular, a regional dependency is advantageous. For example, the correction factor may have a value less than the magnitude 1, such that, in the event of connection of the differential pressure correction device, the pressure difference determined by the differential pressure sensor is smaller than the respectively predefined pressure difference threshold value. Furthermore, it is provided in particular that, in an operating state in which the respectively determined pressure difference is smaller than or equal to the respectively predefined pressure difference threshold value, the correction factor is a factor with a magnitude equal to 1.

By means of a regional dependency of the correction factor on the detected pressure difference and, alternatively or in addition to this, on the pressure difference threshold value, a complete regeneration cycle can be performed with a connected or interconnected differential pressure correction device, because the correction factor actually performs a correction of the detected pressure difference for example only for as long as the detected pressure difference is greater than the pressure difference threshold value. If the latter is undershot during the regeneration, although the differential pressure simulation signal then continues to be generated, this then however represents the detected pressure difference.

It may furthermore be provided that the engine control unit operates the internal combustion engine in a general operating profile if a regeneration end criterion is attained for the determined pressure difference.

The regeneration end criterion may be defined as a fixed value of the pressure difference, that is to say as a regeneration end value. When the regeneration end value DPr is attained, it is assumed that no particles, or else only a small quantity of particles, are/is situated in the soot particle filter. It is also conceivable for the regeneration end criterion to be defined as a rate of change of the detected pressure difference with respect to time. As an alternative to this, the regeneration criterion may be defined in that the magnitude of the determined pressure difference changes by less than a minimum magnitude in a predetermined time interval, or the ratio of the magnitude of the determined pressure difference at the end of the predetermined time interval to the magnitude of the determined pressure difference at the start of the time interval is smaller than a particular threshold value, the magnitude of which is for example smaller than 0.1. When the regeneration end criterion is attained, the regeneration of the filter is ended.

The connection or interconnection of the differential pressure correction device may be performed in particular by virtue of a first connection device of the differential pressure correction device being connected to a signal output of the differential pressure sensor and a second connection device of the differential pressure correction device being connected to a signal input of the engine control unit.

By means of the interconnection by way of a plug-in connection, it is ensured that the method can be carried out in a particularly straightforward manner. This additionally increases the cost-effectiveness of the method. The plug-in connections may additionally be designed to be protected against polarity reversal. Incorrect implementation of the method is thus ruled out.

According to the invention, a system for regenerating a soot particle filter of an internal combustion engine is also provided. The system has:

an internal combustion engine, a soot particle filter arranged in an exhaust-gas section of the internal combustion engine, a differential pressure sensor which detects a pressure difference between an exhaust-gas inlet and an exhaust-gas outlet of the soot particle filter, an engine control unit which, from a differential pressure signal received from a differential pressure sensor, determines a pressure difference and which compares the pressure difference with a predefined pressure difference threshold value and which operates the internal combustion engine in a regeneration operating profile if the determined pressure difference is smaller than the pressure difference threshold value and greater than the pressure difference threshold value, a pressure difference correction device which is connected in a functionally decoupleable manner to the differential pressure sensor and to the engine control unit, wherein the differential pressure correction device has a differential pressure correction function which generates a differential pressure simulation signal, wherein the engine control unit determines, from the differential pressure simulation signal, a pressure difference which is smaller than the pressure difference threshold value, such that the engine control unit operates the internal combustion engine in the regeneration operating profile.

The determined pressure difference is proportional to a particle quantity situated in the soot particle filter.

By virtue of the fact that the differential pressure correction device is designed to be functionally decoupled, that is to say for example capable of being plugged in and unplugged, the system is easy to handle. By means of the connection or interconnection of the differential pressure correction device, it is possible to perform a regeneration of the soot particle filter without modifying the regulation processes of the engine control unit. Thus, the system can be easily retrofitted in motor vehicles with a soot particle filter.

In the system, it may be provided in particular that the correction function of the differential pressure correction device generates the differential pressure simulation signal by multiplication of the differential pressure signal by a correction factor.

Here, the correction factor may be regionally dependent on the determined pressure difference.

The advantages of such a configuration of the correction factor have already been described above on the basis of the method according to the invention, and are achieved analogously with the system according to the invention.

It may furthermore be provided that the engine control unit sets a general operating state of the internal combustion engine if a regeneration end criterion is attained for the determined pressure difference.

The definitions of the regeneration end criterion given with regard to the method apply analogously to the system according to the invention.

It may be advantageous that the differential pressure correction device is connected by virtue of a first connection device of the differential pressure correction device being coupleable to a signal output of the differential pressure sensor and a second connection device of the differential pressure correction device being coupleable to a signal input of the engine control unit.

The coupling may be realized for example by means of a plug-in connection. Coupling by means of wireless data transmission is also possible.

Here, the expressions "laden state" and "filled state" are each to be understood generally to mean a state of the soot particle filter in which, in the soot particle filter, there is situated a particle quantity, for example a particular mass of soot, dust or other particles, which is greater than or equal to a maximum admissible particle quantity. The maximum admissible particle quantity gives rise to a pressure loss in a flow, in particular an exhaust-gas flow, from the exhaust-gas inlet to the exhaust-gas outlet of the soot particle filter, which pressure loss is greater than or equal to a maximum admissible value for the pressure loss, in particular a pressure difference threshold value.

Here, the expression "regeneration of the soot particle filter" is to be understood generally to mean the removal of particles situated in the soot particle filter, in particular by oxidation of the particles, in particular during an oxidation triggered by the thermal and stoichiometric conditions in the exhaust gas.

Here, the expressions "overladen state" or "overloaded state" are each to be understood generally to mean a laden state of the soot particle filter in the case of which, in the soot particle filter, there is situated a particle quantity, for example a particular mass of soot, dust or other particles, which has a thermal energy content which could lead to thermal destruction of the soot particle filter in the event of uncontrolled oxidation of the particles. In the overladen state, the particle quantity gives rise to a pressure loss in the flow from the exhaust-gas in that the exhaust-gas outlet of the soot particle filter, which pressure loss is greater than a pressure difference threshold value.

Here, the expression "regenerated state" is to be understood generally to mean a state of the soot particle filter in which, in the soot particle filter, there is situated a particle quantity, for example a particular mass of soot, dust or other particles, which gives rise to a pressure loss in a flow, in particular an exhaust-gas flow, from the exhaust-gas inlet to the exhaust-gas outlet of the soot particle filter, which pressure loss is smaller than the admissible value for the pressure loss, and in the presence of which pressure loss the regeneration end criterion is attained.

Other objects, advantages and novel features of the present invention will become apparent from the following detailed description of one or more preferred embodiments when considered in conjunction with the accompanying drawings.

Exemplary embodiments of the invention will be described below on the basis of the drawings.

DETAILED DESCRIPTION OF THE DRAWINGS

Figure 1:
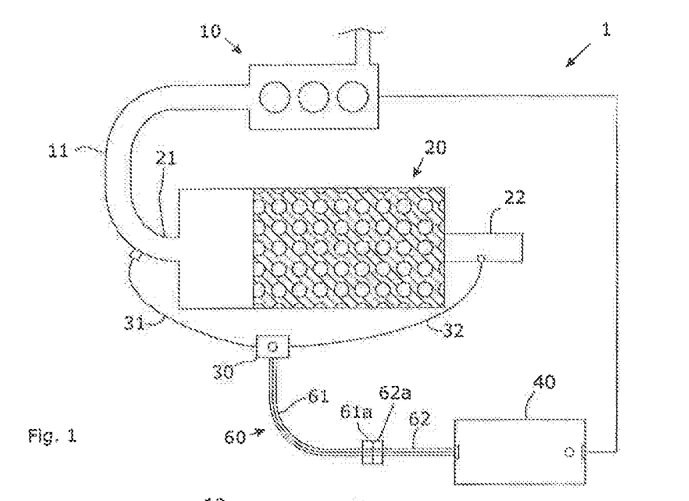
FIG. 1 is a schematic illustration of a system according to the invention for regenerating a soot particle filter, wherein, in this illustration, a differential pressure connection device is not interconnected, and the soot particle filter is in an overladen state.
Figure 2:
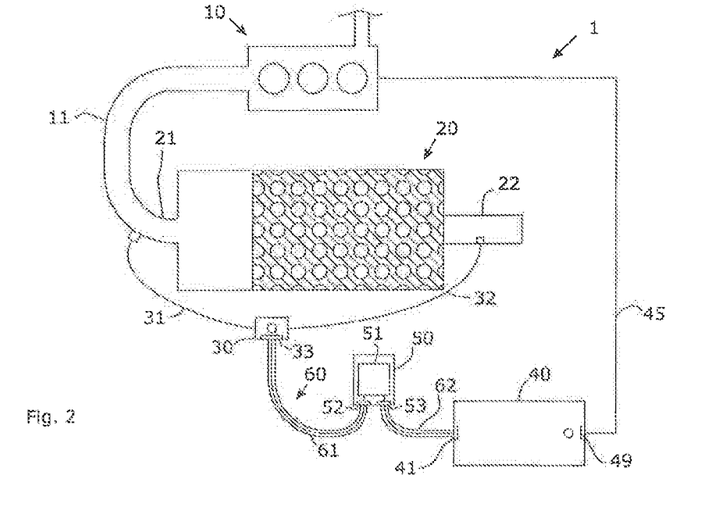
FIG. 2 is a schematic illustration of the system according to the invention during a regeneration of the soot particle filter, wherein, in this illustration, the differential pressure correction device has been interconnected.

FIGS. 1 and 2 show a system 1 according to the invention for regenerating a soot particle filter 20 of an internal combustion engine 10. The system 1 has an internal combustion engine 10. The exhaust gas generated in the internal combustion engine 10 by combustion of a fuel-air mixture is supplied via an exhaust-gas tract 11 to a soot particle filter 20, which is arranged in particular in the exhaust-gas tract 11. The exhaust-gas tract 11 may be formed as a pipeline with one or more pipes or ducts.

The soot particle filter 20 has an exhaust-gas inlet 21, through which the exhaust gas is supplied to the soot particle filter 20, and an exhaust-gas outlet 22, by which the exhaust gas is discharged from the soot particle filter 20. The exhaust-gas inlet 21 is generally arranged in or coupled to the exhaust-gas tract 11 and may for example be connected by means of a flange to a pipeline of the exhaust-gas tract 11.

The soot particle filter 20 may in particular be a ceramic filter of the so-called wall-flow type. Here, the exhaust gas flows along a filter duct which is open at one side, and passes through filter openings which are formed in walls which delimit the filter duct and in which particle situated in the exhaust gas are separated off from the exhaust gas. The wall surfaces in particular in the region of the filter openings thus form a filter surface which defines an effective flow cross section.

The system 1 according to the invention furthermore has a differential pressure sensor 30 which detects a pressure difference DPe between the exhaust-gas inlet 21 and the exhaust-gas outlet 22 of the soot particle filter 20. For this purpose, the pressure, in particular the static pressure of the exhaust gas, in the exhaust-gas inlet 21 is provided by means of a first measurement line 31, and the pressure, in particular the static pressure of the exhaust gas in the exhaust-gas outlet 22 is provided by means of a second measurement line 32. From the pressures, the differential pressure sensor 30 detects, or the differential pressure sensor 30 determines by means of a subtraction device, the pressure difference DPe.

Owing to the disposition of particles on the filter surface, the filter surface of the soot particle filter 20 is reduced with an increasing quantity of deposited particles. This leads to a reduction of the effective flow cross section of the soot particle filter 20 and thus to a change in the pressure difference between exhaust-gas inlet 21 and exhaust-gas outlet 22. The detected pressure difference DPe is therefore proportional to the particle quantity situated in the soot particle filter 20. In particular, a relatively large particle quantity situated in the soot particle filter 20 leads to a relatively large pressure loss in the soot particle filter 20, and a relatively small particle quantity situated in the soot particle filter 20 leads to a relatively small pressure loss in the soot particle filter 20.

Furthermore, the system 1 according to the invention has an engine control unit 40. The latter is functionally coupled to the differential pressure sensor 30. Depending on the magnitude of the detected pressure difference DPe, the engine control unit 40 may be directly functionally coupled to the differential pressure sensor 30, for example by means of a signal line 60 (FIG. 1) or by means of a wireless data connection, or may be functionally coupled indirectly via an interconnected differential pressure correction device 50. In the latter case, it is optionally additionally possible for a direct functional coupling, that is to say by means of a signal line 65 or by means of a wireless data connection (not shown), to be provided between the engine control unit 40 and the differential pressure sensor 30.

The engine control unit 40 operates the internal combustion engine 10 in a regeneration operating profile S1 or in a general operating profile S2, or sets these in each case. In the case of the regeneration operating profile S1, the internal combustion engine 10 is operated such that, at the soot particle filter 20, an exhaust-gas temperature prevails at which a regeneration of the soot particle filter takes place. Alternatively or in addition to this, the engine control unit 40 may be configured such that it generates command specifications on a display device integrated for example in the cockpit, which are displayed by the display device as actuation instructions for the execution of the regeneration operating profile S1 by a driver seated in the cockpit. In the case of the general operating profile S2, the internal combustion engine 10 is operated such that, at the soot particle filter 20, and exhaust-gas temperature prevails at which no regeneration of the soot particle filter takes place. The general operating profile S2 may for example encompass all operating states predefined by the driver that are required during the driving operation of a motor vehicle.

In one embodiment of the engine control unit 40, the latter, from differential pressure signals received from the differential pressure sensor 30, determines in each case a pressure difference DPe. In general, the engine Control unit 40 has a first comparison function 42 which receives an input signal DPin with a value corresponding to a pressure difference and which compares the input signal with a differential pressure difference threshold value DPg. The input signal DPin comprises either the determined pressure difference DPe or a pressure difference determined from a differential pressure simulation signal DPs.

If the pressure difference of the input signal DPin is smaller than the pressure difference threshold value DPg, then in a second comparison function 43a of the engine control unit 40, a comparison of the pressure difference of the input signal DPin with a regeneration threshold value DPl is performed. The regeneration threshold value DPl is a value of the pressure difference in the soot particle filter 20, in the case of which it is assumed that, in the soot particle filter 20, there is situated a quantity of particles above which a regeneration of the soot particle filter is required. Above the regeneration threshold value DPl, the soot particle filter 20 is thus in a laden state. If the result in the second comparison function 43a yields that the pressure difference of the input signal DPin is greater, the engine control unit 40 operates the engine 10 in the regeneration operating profile S1.

The engine control unit operates the engine 10 in the general operating profile S2 when the comparison in the first comparison function 42 yields that the pressure difference of the input signal DPin is greater than the pressure difference threshold value DPg.

If the comparison in the second comparison function 43a yields that the pressure difference of the input signal DPin is smaller than the pressure difference threshold value DPl, then a comparison of the pressure difference of the input signal DPin with a regeneration end criterion KR is performed in a third comparison function 43b of the engine control unit 40.

In this respect, as a regeneration end criterion KR, it may be provided that the determined pressure difference DPe attains a predefined regeneration end value DPr. When the regeneration end value DPr is attained, it is assumed that no particles or only a small quantity of particles are/is still situated in the soot particle filter 20. The regeneration end value DPr lies, in terms of magnitude, below the magnitude of the pressure difference threshold value DPg and below the regeneration threshold value DPl. As an alternative to this, the regeneration criterion KR may be defined in that, in a predetermined time interval, the magnitude of the determined pressure difference DPe changes by less than a minimum magnitude, or the ratio of the magnitude of the determined pressure difference DPe at the end of the predetermined time interval to the magnitude of the determined pressure difference DPe at the start of the time interval is smaller than a certain threshold value, the magnitude of which is for example smaller than 0.1.

If the regeneration end criterion KR is present, the engine control unit 40 operates the engine 10 in the general operating profile S2.

The situation in which the pressure difference DPe reaches the predefined. pressure difference threshold value DPg may arise in particular in a predefined overladen state of the soot particle filter 20. If the pressure difference DPe prevailing in the soot particle filter 20 readies the predefined pressure difference threshold value DPg, there is situated in the soot particle filter 20 a particle quantity whose thermal energy content is so great that an uncontrolled oxidation of the particles would lead to thermal destruction of the soot particle filter 20. An uncontrolled oxidation could arise for example during the regeneration of the soot particle filter 20 as a result of the oxygen fraction in the exhaust gas abruptly increasing.

FIGS. 1 and 2 show the soot particle filter 20 in an overladen state or during the execution of the regeneration operating profile S1. In one embodiment of the engine control unit 40, the latter operates the internal combustion engine 10 in the regeneration operating profile S1 for as long as the determined pressure difference DPe is smaller than the pressure difference threshold value DPg and greater than the pressure difference threshold value DPl. For this purpose, the internal combustion engine 10 and the engine control unit 40 are functionally coupled, for example by means of a control line 45 or by means of a wireless data connection. In particular, the engine control unit 40 generates command signals which are transmitted to at least one actuator for the operation of the internal combustion engine 10, for example a throttle lap of a combustion air supply, to control valves or to a fuel injection device, such that the respective component is actuated by means of the command signals. In a further embodiment, it may be provided that the actuators for the operation of the internal combustion engine 10 are actuated, such that the internal combustion engine 10 performs a regeneration operating profile S1, by a driver in the cockpit of the vehicle on the basis of command signals displayed by a display device, which command signals are generated by the engine control unit 40.

For the operation of the internal combustion engine 10 in the regeneration operating profile S1, the components are actuated by means of the actuation signal such that, in the exhaust gas of the internal combustion engine 20, conditions prevail in the case of which a regeneration of the soot particle filter 20 takes place. Such conditions exist for example in the case of an exhaust-gas temperature in the range between 450° C. and 600° C. and in particular between 500° C. and 550° C.

For during the operation of the internal combustion engine 20 in the regeneration operating profile S1, it is advantageously provided that the exhaust-gas temperature is constant within the abovementioned range. This reliably prevents an abrupt change of the exhaust-gas conditions leading to a damaging impairment of the soot particle fitter 20.

The system according to the invention has a differential pressure correction device 50 which is electrically and thus functionally connectable by means of measurement lines 31, 32 to the differential pressure sensor 30 and to the engine control unit 40 and, in a state connected to these, is electrically and thus functionally releasable or decoupleable from these. FIG. 2 shows the differential pressure correction device 50 in a connected and thus interconnected state.

The differential pressure correction device 50 has a differential pressure correction function 51, which generates a differential pressure simulation signal and transmits this to a second connection device 53 of the differential pressure correction device 50. The differential pressure simulation signal represents a pressure difference which is smaller than the predefined pressure difference threshold value DPg.

According to the invention, the differential pressure correction device 50 is connected to the differential pressure sensor 30 and to the engine control unit 40, and is connected between these, if the determined pressure difference DPe is greater than the predefined pressure difference threshold value DPg. In a situation in which the differential pressure correction device 50 is not interconnected, the engine control unit 40, in particular the first comparison function 42 of the engine control unit 40, receives from the differential pressure sensor 30 an input signal DPin with a value corresponding to the detected pressure difference DPe.

If, in this situation, the state additionally exists in which the respectively determined pressure difference DPe is greater than the predefined pressure difference threshold value DPg, the comparison of a pressure difference DPe determined from the input signal DPin with the predefined pressure difference threshold value DPg would also yield that the determined pressure difference DPe is greater than the pressure difference threshold value DPg. As a result, the engine control unit 40 would not permit the regeneration of the soot particle filter 20. For example, in the state, operation of the internal combustion engine 10 in the general operating profile S2 could be provided, during the implementation of which, in the exhaust gas of the internal combustion engine 10, a state prevails in which no regeneration of the soot particle filter 20 takes place, in particular because the exhaust-gas temperatures lie below 500° C. By contrast, in the state in which the respectively determined pressure difference DPe is greater than the predefined pressure difference threshold value DPg, it is achieved by means of the interconnection of the differential pressure correction device 50 that the engine control unit 40 receives, as input signal DPin, a differential pressure simulation signal DPs which represents a pressure difference smaller than the pressure difference threshold value DPg. As a result, the engine control unit 40 then operates the internal combustion engine 10 in the regeneration operating profile S1, in the case of which the soot particle filter 20 is regenerated.

The possibility of the differential pressure correction device 50 being connected to the differential pressure sensor 30 and to the engine control unit 40 and being functionally interconnected between these may be realized for example in the manner shown in FIG. 2. Accordingly, it may be provided that a first connection device 52 of the differential pressure correction device 50 is coupleable to a signal output 33 of the differential pressure sensor 30 and a second connection device 53 of the differential pressure correction device 50 is coupleable to a signal input 41 of the engine control unit 40. FIG. 2 shows the system 1 in a state in which the first and the second connection device 52 and 53 are each in a coupled-on state.

Figure 3:
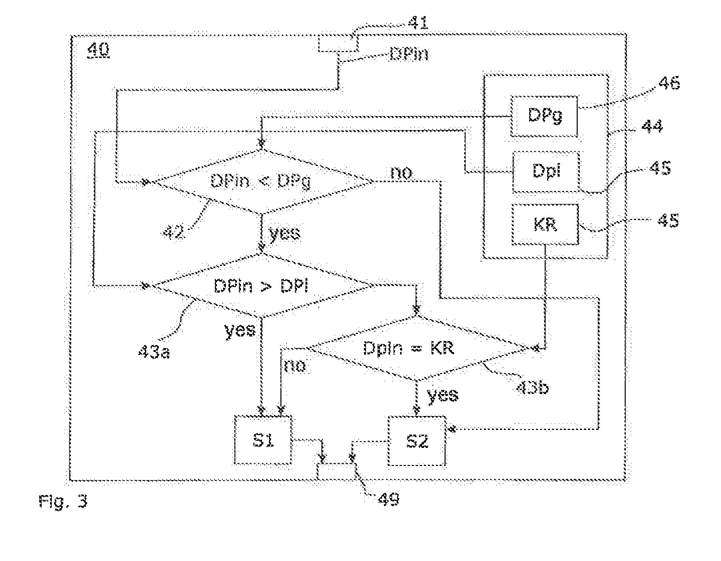
FIG. 3 is a schematic illustration of an exemplary sequence of a method according to the invention for regenerating a soot particle filter.

The first and second connection devices 52 and 53 of the differential pressure correction device 50 may each be realized as a socket or plug, as shown in FIG. 2. In the embodiments of FIGS. 1 to 3, it is for example the case that the first connection device 52 is realized as a socket and the second connection device 53 is realized as a plug or vice versa. As shown in FIG. 2, the differential pressure correction device 50 is connected between the differential pressure sensor 30 and the engine control unit 40 in that a first signal line part 61, for example with a plug 61*a,* which is coupled to a signal output 33 of the differential pressure sensor 30 is releasably plugged into the first connection device 52, and, for example, a socket 62*a* of a second signal line part 62 is releasably plugged onto the second connection device 53.

FIG. 1 shows a system 1 without a differential pressure correction device 50 that is possibly to be connected in accordance with the invention, wherein the signal line 60 is formed from a first signal line part 61 and a second signal line part 62, which are connected to one another at ends facing toward one another. For this purpose, in the illustrated state of the system 1, a plug 61*a* of the first signal line part 61 is releasably plugged into a socket 62*a* of the second signal line part 62.

FIG. 2 shows a system 1 with the connected differential pressure correction device 50. The first connection device 52 of the differential pressure correction device 50 may also be realized as a receiver device for receiving wirelessly transmitted signals, such as infrared signals, acoustic signals or electromagnetic signals. It is also possible for the second connection device 53 of the differential pressure correction device 50 to be realized as a transmitter device for transmitting wirelessly transmissible signals. In this case, it is also possible for the signal output 33 of the differential pressure sensor 30 to be realized as an interface or transmitter device for transmitting, and for the signal input 41 of the engine control unit 40 to be realized as a receiver device for receiving, wirelessly transmissible signals. The differential pressure correction device 50 is then activatable by activation of the transmitting and receiving devices.

The functioning of the correction function 51 of the differential pressure correction device 50 is schematically shown in FIG. 2. For example, it may be provided that the correction function 51 generates the differential pressure simulation signal DPs by multiplication of the received differential pressure signal, which represents the detected pressure difference DPe, by a correction factor K. Here, the correction factor K may generally be dependent on the determined pressure difference DPe. For example, a regional dependency of the correction factor K may be provided. In particular, the correction factor may have a value with a magnitude less than 1, such that, when the differential pressure correction device 50 is connected, the pressure difference DPe determined by the differential pressure sensor 30 is smaller than the respectively predefined pressure difference threshold value DPg. Furthermore, it is provided in particular that, in an operating state in which the respectively detected pressure difference DPe is smaller than or equal to the respectively predefined pressure difference threshold value DPg, the correction factor K is a factor with a magnitude equal to 1.

The method according to the invention for regenerating the soot particle filter 20, which can be performed in particular with the system 1 according to the invention, will be described below.

During the operation of the internal combustion engine 10, the engine control unit 40, with the first comparison function 42, compares the pressure difference DPe, which is determined on the basis of the differential pressure signal detected between the exhaust-gas inlet and the exhaust-gas outlet 22 of the soot particle filter 20 by means of the differential pressure sensor 30, with the pressure difference threshold value DPg. If the determined pressure difference DPe is smaller than the pressure difference threshold value DPg and greater than the pressure difference threshold value DPl, the engine control unit 40 should operate the internal combustion engine 10 in the regeneration operating profile S1.

If the determined pressure difference DPe is smaller than the pressure difference threshold value DPg, regeneration operation of a laden filter is performed by realizing the regeneration operating state S1 of the internal combustion engine 10. The regeneration operating profile S1 of the engine 10 is configured such that the exhaust-gas temperature required for the regeneration prevails at the soot particle filter 20, and the particles situated in the soot particle filter 20 are oxidized. In the usage situation in a vehicle, this may also arise during travel, as long as the determined pressure difference DPe is smaller than the pressure difference threshold value DPg. In this case, the soot particle filter 20 is not in an overladen state. Consequently, an abrupt increase of the oxygen content in the exhaust gas that is effected during travel does not lead to thermal destruction of the soot particle filter. An abrupt increase of the oxygen content in the exhaust gas may arise for example if the power demanded of the internal combustion engine 10 by the vehicle is suddenly decreased.

If the determined pressure difference DPe is greater than the pressure difference threshold value DPg, the differential pressure correction device 50 is connected to the differential pressure sensor 30 and to the engine control unit 40 and, here, is connected between the differential pressure sensor 30 and the engine control unit 40 (FIG. 2). In this way, the differential pressure correction device 50 is functionally coupled to the differential pressure sensor 30 and to the engine control unit 40. The interconnection of the differential pressure correction device 50 is performed in particular by virtue of a first connection device 52 of the differential pressure correction device 50 being connected to a signal output 33 of the differential pressure sensor 30 and a second connection device 53 of the differential pressure correction device 50 being connected to a signal input 41 of the engine control unit 40. The differential pressure correction device 50 generates a differential pressure simulation signal DPs which, in terms of magnitude, corresponds to a pressure difference which is smaller than the pressure difference threshold value DPg, and the differential pressure correction device transmits this to the engine control unit 40, in particular to the first comparison function 42 thereof. The latter thus receives, as input signal DPin, a pressure difference which is smaller than the pressure difference threshold value DPg, and sets the regeneration operating profile S1.

In this way, the advantage is achieved that even overladen soot particle filters 20 can be regenerated again. By means of the manipulation of the differential pressure signal with the differential pressure correction device 50, the regeneration operating profile S1 can be set independently of the actually measured pressure difference. In the case of internal combustion engines of motor vehicles, this is highly advantageous because, in this way, an already overladen soot particle filter 20 can be regenerated again during maintenance work.

After the method according to the invention has been executed, the soot particle filter 20 has been regenerated. Here, the regeneration end criterion KR is present. The differential pressure correction device 50 can consequently be removed again.

According to the invention, it may be provided that the pressure difference threshold value DPg and the regeneration threshold value DPl and the regeneration end criterion KR are stored as presets in a memory 44, in particular also as variables 45. To realize the regeneration operating profile S1 and the general operating profile S2, in each case as one group of actuation commands may be stored in a memory, for example in the engine control unit 40.

LIST OF REFERENCE CHARACTERS

10 Internal combustion engine
20 Soot particle filter
21 Exhaust-gas inlet
22 Exhaust-gas outlet
30 Differential pressure sensor
31 First measurement line of the differential pressure sensor
32 Second measurement line of the differential pressure sensor
33 Signal output of the differential pressure sensor
40 Engine control unit
41 Signal input of the engine control unit
42 First comparison function
43a Second comparison function
43b Third comparison function
44 Memory
45 Variables
49 Output signal of the engine control unit
50 Differential pressure correction device
51 Correction function
52 First connection device of the differential pressure correction device
53 Second connection device of the differential pressure correction device
60 Signal line
61 First signal line part
62 Second signal line part
DPe Determined pressure difference
DPg Pressure difference threshold value
DPl Pressure difference threshold value
DPs Pressure difference simulation signal
DPin Input signal of the comparison function
DPr Regeneration end value
K Correction factor
S1 Regeneration operating profile
S2 General operating profile The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for regenerating a soot particle filter of an internal combustion engine, comprising the acts of:
    determining by an engine control unit a pressure difference which prevails between an exhaust-gas inlet and an exhaust-gas outlet of the soot particle filter from a differential pressure signal received from a differential pressure sensor;
    comparing the determined pressure difference with a pressure difference threshold value and a regeneration threshold value and operating the internal combustion engine in a regeneration operating profile if the determined pressure difference is smaller than the pressure difference threshold value and greater than the regeneration threshold value; and
    if the determined pressure difference is greater than the pressure difference threshold value, connecting a differential pressure correction device between the differential pressure sensor and the engine control unit and generating and transmitting a differential pressure simulation signal by the differential pressure correction device to the engine control unit such that as a result the engine control unit operates the internal combustion engine in the regeneration operating profile.

2. The method as claimed in claim 1, wherein the differential pressure simulation signal is generated by multiplication of the differential pressure signal by a correction factor.

3. The method as claimed in claim 2, wherein the correction factor is dependent on the determined pressure difference.

4. The method as claimed in claim 3, further comprising the act of operating the internal combustion engine by the engine control unit in a general operating profile if a regeneration end criterion is attained for the determined pressure difference.

5. The method as claimed in claim 3, wherein the connecting of the differential pressure correction device is performed via a first connection device of the differential pressure correction device connected to a signal output of the differential pressure sensor and a second connection device of the differential pressure correction device connected to a signal input of the engine control unit.

6. The method as claimed in claim 2, further comprising the act of operating the internal combustion engine by the engine control unit in a general operating profile if a regeneration end criterion is attained for the determined pressure difference.

7. The method as claimed in claim 2, wherein the connecting of the differential pressure correction device is performed via a first connection device of the differential pressure correction device connected to a signal output of the differential pressure sensor and a second connection device of the differential pressure correction device connected to a signal input of the engine control unit.

8. The method as claimed in claim 1, further comprising the act of operating the internal combustion engine by the engine control unit in a general operating profile if a regeneration end criterion is attained for the determined pressure difference.

9. The method as claimed in claim 8, wherein the connecting of the differential pressure correction device is performed via a first connection device of the differential pressure correction device connected to a signal output of the differential pressure sensor and a second connection device of the differential pressure correction device connected to a signal input of the engine control unit.

10. The method as claimed in claim 1, wherein the connecting of the differential pressure correction device is performed via a first connection device of the differential pressure correction device connected to a signal output of the differential pressure sensor and a second connection device of the differential pressure correction device connected to a signal input of the engine control unit.

11. A system, comprising:
an internal combustion engine;
a soot particle filter disposed in an exhaust-gas section of the internal combustion engine;
a differential pressure sensor for detecting a pressure difference between an exhaust-gas inlet and an exhaust-gas outlet of the soot particle filter;
an engine control unit, wherein the engine control unit determines the pressure difference from a differential pressure signal received from the differential pressure sensor, compares the determined pressure difference with a pressure difference threshold value and a regeneration threshold value, and operates the internal combustion engine in a regeneration operating profile if the determined pressure difference is smaller than the pressure difference threshold value and greater than the regeneration threshold value; and
a differential pressure correction device, wherein if the determined pressure difference is greater than the pressure difference threshold value, the differential pressure correction device is decoupleably connected to the differential pressure sensor and to the engine control unit such that a differential pressure correction function of the differential pressure correction device generates and transmits a differential pressure simulation signal to the engine control unit and such that as a result the engine control unit operates the internal combustion engine in the regeneration operating profile.

12. The system as claimed in claim 11, wherein the differential pressure correction function of the differential pressure correction device generates the differential pressure simulation signal by multiplication of the differential pressure signal by a correction factor.

13. The system as claimed in claim 12, wherein the correction factor is dependent on the determined pressure difference.

14. The system as claimed in claim 13, wherein the engine control unit sets a general operating profile of the internal combustion engine if a regeneration end criterion is attained for the determined pressure difference.

15. The system as claimed in claim 13, wherein the differential pressure correction device is connected by a first connection device of the differential pressure correction device coupled to a signal output of the differential pressure sensor and a second connection device of the differential pressure correction device coupled to a signal input of the engine control unit.

16. The system as claimed in claim 12, wherein the engine control unit sets a general operating profile of the internal combustion engine if a regeneration end criterion is attained for the determined pressure difference.

17. The system as claimed in claim 12, wherein the differential pressure correction device is connected by a first connection device of the differential pressure correction device coupled to a signal output of the differential pressure sensor and a second connection device of the differential pressure correction device coupled to a signal input of the engine control unit.

18. The system as claimed in claim 11, wherein the engine control unit sets a general operating profile of the internal combustion engine if a regeneration end criterion is attained for the determined pressure difference.

19. The system as claimed in claim 18, wherein the differential pressure correction device is connected by a first connection device of the differential pressure correction device coupled to a signal output of the differential pressure sensor and a second connection device of the differential pressure correction device coupled to a signal input of the engine control unit.

20. The system as claimed in claim 11, wherein the differential pressure correction device is connected by a first connection device of the differential pressure correction device coupled to a signal output of the differential pressure sensor and a second connection device of the differential pressure correction device coupled to a signal input of the engine control unit.

\* \* \* \* \*